United States Patent [19]

Taylor

[11] Patent Number: 4,588,629
[45] Date of Patent: May 13, 1986

[54] EMBOSSED FABRICS TO GIVE CONTRASTING COLORS

[76] Inventor: Derek P. Taylor, The Old Yells Farm, Hilton La., Essington, Near Wolverhampton, England

[21] Appl. No.: 750,183

[22] Filed: Jul. 1, 1985

[30] Foreign Application Priority Data

Jul. 3, 1984 [GB] United Kingdom ............... 8416850
Aug. 24, 1984 [GB] United Kingdom ............... 8421563

[51] Int. Cl.⁴ ............................................. B32B 33/00
[52] U.S. Cl. ........................................ 428/88; 156/72; 156/209; 427/206; 428/90
[58] Field of Search ............... 428/88, 89, 90; 156/72, 156/209; 427/206

[56] References Cited

U.S. PATENT DOCUMENTS

| | | | |
|---|---|---|---|
| 2,723,937 | 11/1955 | Rice | 428/88 |
| 2,901,373 | 8/1959 | Weiss | 428/88 |
| 3,968,288 | 7/1976 | Trexler | 428/161 |
| 4,418,106 | 11/1983 | Landler et al. | 428/89 |

FOREIGN PATENT DOCUMENTS

| | | |
|---|---|---|
| 1122026 | 7/1965 | United Kingdom . |
| 1159809 | 7/1969 | United Kingdom . |
| 1206974 | 9/1970 | United Kingdom . |
| 1428138 | 10/1973 | United Kingdom . |

*Primary Examiner*—Marion E. McCamish
*Attorney, Agent, or Firm*—Parmelee, Miller, Welsh & Kratz

[57] ABSTRACT

A fabric suitable for embossing to form a pattern thereon comprises a substrate (10) of a thermo-plastic material which carries a coating of fibres (11) such that under the application of heat and pressure the fibres may be compressed into the substrate. The fibres are coloured and the substrate is either colourless or of a colour which contrasts with the fibres. When the fibres are compressed into the substrate, the latter is at least partially revealed so as to produce an area (12) of colour which contrasts with the fibres adjacent to such area.

7 Claims, 4 Drawing Figures

EMBOSSED FABRICS TO GIVE CONTRASTING COLORS

BACKGROUND OF THE INVENTION

Embossed fabrics have previously been made by a variety of methods, some of which involve adhesion of a facing layer on one side of a compressible filler material to a backing layer on the reverse side of such filler material so as to compress the filler material at and adjacent to the points at which the facing and backing layers are joined, thereby to effect the required embossing, which may for example thereby form a quilted fabric having a quilted appearance. Generally, it has been desired to prevent any change of colour appearing where such embossing has occurred, however, by contrast, the present invention seeks to provide a colour contrast for decorative or other purposes during an embossing operation.

SUMMARY OF THE INVENTION

According to the invention, we provide an embossed fabric comprising a coating of fibres of one or more colours on a substrate of a thermoplastic material which presents a base colour which contrasts with the fibres wherein in selected areas the coating fibres have been compressed by the application of heat and pressure into the substrate so as at least partially to reveal a colour contrasting with that of the fibres adjacent to said selected areas.

In accordance with the present invention, if the fibres possess a marked colour, the substrate may comprise a thermo-plastic material which is substantially colourless, for example being transparent or translucent; likewise, if the substrate possesses a marked colour, the fibres may be colourless, transparent or translucent; and the term "colour" in this context should be construed accordingly.

Even in such cases, where coloured fibres are compressed into a colourless substrate or where colourless fibres are compressed into a coloured substrate, the effect is to produce a colour contrast between the areas of the fabric in which the fibres are unaffected and those adjacent areas in which the fibres are compressed into the substrate, but both the substrate and the fibres may be positively coloured.

The invention arises from the surprising discovery that fibres of a flock-like material applied to a thermoplastic substrate can be compressed by the application of heat and pressure into the substrate so as to effect not only an embossing of the flock coating, but also the establishment of a colour contrast as a result of the substrate being at least partially revealed where the flock fibres have been absorbed into it. Whilst it would be expected that the compressed flock fibres would form a superficial layer which would continue to mask the colour of the substrate, we have found that the fibres can be absorbed into the substrate, even where this is a thin layer, to such a degree that the colour of the fibre is effectively lost and the colour of the substrate is revealed, and although possibly modified by the fibres, nevertheless produces a significant visual effect.

In this way, it is possible to make a decorative patch, for example, for application to articles of clothing. However, significantly, the thermoplastic substrate may be chosen so as to enable the patch to be bonded directly to clothing (or cloth) during the embossing process.

Thus, the invention also resides in a fabric comprising a coating in the form of fibres of one or more colours (which term includes colourless) on a substrate of a thermoplastic material which presents a base colour which contrasts with the fibres such that the application of heat and pressure to the fabric in selected areas causes the fibres to be compressed into the substrate and thereby at least partially reveal the substrate to give rise to a colour in said selected areas which contrasts with that of the fibres adjacent to said selected areas.

This fabric may therefore be supplied in an unembossed form to the user who may simultaneously attach it to a suitable surface possibly forming part of an article of clothing, by virtue of the adhesive effect obtained by heating and softening the thermoplastic material of the substrate whilst the latter is engaged with the surface under pressure, any desired pattern being simultaneously formed by the application of heat and pressure in selected areas so that the fibres in those areas are absorbed into the thermoplastic material of the substrate while the latter is adhered to the fabric to which it is applied.

The fabric in accordance with the invention may also be employed as a facing layer on one side (or both sides) of a compressible filler which may be embossed or quilted by the application of heat and pressure so as simultaneously to indent the filler and emboss the facing layer by compressing the fibres into the substrate and producing a contrasting colour. For example, by applying heat and pressure at a series of spaced points along a line, a quilting effect can be obtained in the thickness of the filler, with the appearance of "stitches" along the line due to the colour contrast obtained by the action of heat and pressure on the fibre coating of the facing layer.

The substrate itself, however, may be carried by a layer of backing material and in this case the substrate may be in the form of a discontinuous layer of the thermoplastic material, consisting for example of discrete or interconnected stripes, lines, bands, circles, patches, etc., so that the substrate itself presents a pattern relative to the backing layer (which may contrast by virtue of colour and/or texture) and an embossed colour-contrasting pattern can then be formed on the flocked thermoplastic substrate covered areas of the fabric.

The invention further resides in a method of producing a visible image on a fabric which consists of a coating in the form of fibres of one or more colours (which term includes colourless) on a substrate of a thermoplastic material which presents a base colour which contrasts with the fibres, wherein in selected areas corresponding to the desired visual image, heat and pressure is applied to the fabric so as to compress the fibres into the substrate and thereby produce a contrasting colour in said areas.

The substrate may be made from any suitable thermoplastic material in the broadest sense, such as a hot-melt adhesive, PVC, or other similar substance which will soften with the application of heat. The thermoplastic material may be cast, extruded or otherwise formed into a continuous film or sheet which is self-supporting, or it may be formed on a carrier material so as to be either permanently united with such material or readily releasable therefrom. Where the thermoplastic material is permanently united with such a carrier, it may be formed as an interrupted or discontinuous layer consisting of separate or discrete areas of thermoplastic material. On the other hand, where the thermoplastic material is deposited in a releasable manner, it is preferably in the form of a layer in which all areas thereof are interconnected. However, discrete patches of the thermoplastic substrate could be formed in a similar manner to serve, for example, as labels or patches.

The coating may be formed from chopped fibres such as cotton, nylon, rayon, preferably having a melting or softening point significantly greater than that of the thermoplastic substrate. The coating may be applied to the substrate by a conventional electrostatic flocking process. Alternatively, the coating may be deposited by such a process (or any other suitable process) onto a backing material to which it becomes lightly and releasably adhered so that it may then be transferred to the thermoplastic substrate by applying the coating of fibres to the substrate under such conditions that the fibres adhere thereto, and removing the backing material. To facilitate transfer of the fibres, the exposed surface of the coating carried by the backing material may be treated with a suitable adhesive, or the substrate may be warmed to an extent necessary to make it tacky, or the fibres may be applied shortly after the substrate layer has been formed and while it is still warm enough to be tacky.

The embossing step may be carried out immediately after the flocking step, for example, in a continuous operation, or subsequently in a separate operation.

BRIEF DESCRIPTION OF THE DRAWINGS

The invention will now be described by way of example, with reference to the accompanying drawings wherein.

DESCRIPTION OF THE PREFERRED EMBODIMENTS

Figure 1:
FIG. 1 shows a section through a fabric in accordance with the invention.

In accordance with the invention, a flocked fabric which is capable of being embossed to produce a visible pattern consists, as shown in FIG. 1, of a substrate layer 10 which is formed from a thermoplastic material, such as a hot-melt adhesive or PVC or any other suitable material, for example, including a cross-linking polymer which initially softens with the application of heat and then becomes rigid as curing proceeds. A layer of chopped fibres 11 is applied to the whole, or selected parts, of one surface of the substrate 10 by any suitable process, such as a conventional electrostatic flocking process. The fibres are chosen for their colour since they determine the primary appearance of the fabric but may be of any appropriate colour, including white or neutral colours or even translucent, and the substrate material 10 is chosen to afford a contrasting colour. This material may be coloured by conventional means to present any desired base colour (including white) or may be colourless, translucent or transparent, so long as it gives rise to a colour contract relative to the fibres. In use, the application of heat and pressure to selected areas of the fabric, for example as indicated at 12, causes the substrate 10 to soften and this allows the fibres of the coating 11 in that area to be compressed into the softened substrate. It is not necessary for the fibres themselves to soften or melt during the process, and although they may do so, it is preferred that they do not so as to avoid possible problems with the fibres sticking to the press. When the source of heat and pressure is removed, the substrate becomes firm or set, and the fibres remain trapped. In a typical case, the fibres of the coating 11 may have a length of the order of one millimeter and may be made of any other wide range of materials, such as cotton, nylon or rayon. The thickness of the substrate may be less that 0.5 mm, but in practice it has been established that the substrate can so effectively absorb the fibres that the colour of the substrate is at least partially revealed so as to provide a colour contrast in the area 12 as compared with the adjacent areas where the fibres are unaffected. Thus, by chosing fibres of a colour which contrasts to the colour of the substrate, a visible pattern may be produced.

Whilst the fibres may be of the same colour throughout the whole area of the fabric, it is possible to apply fibres of different colours selectively to different parts of the substrate and thereby obtain a flocked fabric having a patterned multi-coloured surface on which a further pattern in a contrasting colour or colours is formed when the fabric is embossed as described above. The fibres in any specific area of the fabric may be all of a single colour or may be mixed fibres of various colours.

The substrate 10 may itself be carried by a suitable backing layer forming either a permanent or a temporary part of the material. Thus, it may comprise a release paper or the like so that the fabric may serve as a decorative applique, label or patch for transfer to a fabric or other material, including solid or sheet materials of any kind.

Alternatively, the substrate may be deposited onto a permanent backing layer, such as a woven or nonwoven material. The backing layer may itself be secured in any appropriate manner when required to a further article, or it may comprise a fabric for making up into garments, upholstery etc.

Figure 2:
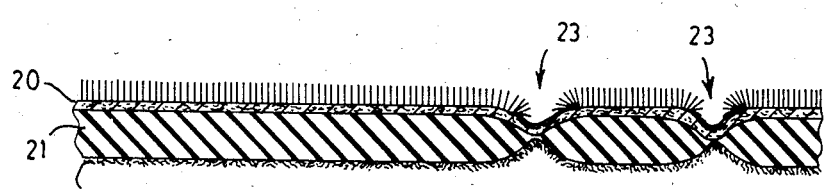
FIG. 2 shows such a fabric when used as a facing layer.

A fabric made as described and shown in FIG. 1 may, as shown in FIG. 2, be applied as a facing layer 20 to one side of a sheet of filler material 21 comprising, for example, a foamed plastics material with a backing layer 22 of any suitable fabric or other sheet material. This material may be embossed or quilted by the application of heat and pressure, for example as indicated at 23 so that the thermoplastic material penetrates the foam material and, when solidified, holds the foamed material in a state of compression. The application of heat and pressure at points 23 simultaneously causes the fibres of the coating to be pressed into the thermoplastic layer and thereby provide a colour contrast where the thermoplastic layer is exposed.

By contacting the material with a heated die that affords, for example, spaced points of contact along desired lines of embossing, the effect of stitching can be obtained in such a quilted fabric, or in a patch or label for visual effect.

Two sheets of the fabric made as described as shown in FIG. 1 are placed back-to-back, i.e. with the substrate 10 in contact. By the application of heat and pressure in a generally peripheral region they are joined together to form a bag or envelope, which remains open over part of the periphery. Through the opening a filler material, such as soft fibres or chopped foam material, is introduced. Instead of using solid filler material, the envelope may be filled with a foaming reaction mixture to form a solid resilient foamed plastics material. In a further operation, the peripheral seal is completed to form a cushion on one or both faces of which a pattern may be simultaneously or subsequently embossed. Alternatively, particularly if a block or slab of soft filler material is used, the two sheets of fabric may be joined peripherally and embossed in a single operation to form the finished cushion. Likewise, a single sheet of the material may be secured to a rigid backing with a layer of cushioning, whether preformed or foamed in-situ, and embossed. In a similar manner, it is possible to form other articles, such as a car seat, or a bedhead or other upholstered part for furniture.

Examples of specific thermoplastic materials which can be employed as the substrate include, but are not limited to, the following:

a moisture cure adhesive available from Bayer (UK) under the designation K.A.8358;

a two-component adhesive available from Larim (Italy) under the designation Larithane B10;

a one-component aliphatic adhesive available from Larim (Italy) under the designation Larithane A.L.251;

a two-component aqueous adhesive available from Bayer (UK) under the designation Dispercoll K.A.8299, (which may also be used without a cross linking agent as a one-component system);

a one hundred percent liquid resin cross linkable thermoplastic available from Texas Adhesives (1984) Limited (UK) under the designation UX2201;

a one hundred percent solid low temperature hot melt cross linkable thermoplastic available from Latent Bondings Limited (UK) under the designation LCA2;

the polyurethane systems as described in Examples 1 and 2 of U.S. Pat. No. 4,393,116.

All these materials, and many others, may be formed into films or sheets by methods such as casting, rolling, or extrusion, to form a continuous, discontinuous or interrupted substrate layer with or without the addition of suitable fillers, pigments or other colouring materials to produce a desired base colour for the fabric in accordance with the invention.

Specifically, such materials can be extruded through a die head to form a continuous film of any width as determined by the size of the die head. Thus, the substrate may in this way comprise a sheet having a width of up to some 6 meters, a strip having a width of some 5 cm to 50 cm, or a ribbon having a width of 1 cm to 5 cm or even less.

Such continuous films may be self supporting and wound, after cooling and setting, onto spools of appropriate size. The flock fibres may be applied either before the film is wound onto such spools, or subsequently when the films are unwound for use.

It will be appreciated that the die head may afford a row of slots so that in a single operation several such strips or ribbons can be formed simultaneously alongside each other, and in particular, in such a case the extruded substrate material may be deposited onto a suitable carrier material. This carrier material may comprise, for example, a release paper from which the substrate can readily be removed for application to a fabric or other backing material when required for use. However, the carrier material may itself comprise a fabric or other backing material with which the thermoplastic substrate is permanently united. Thus, for example, the extruded strips or ribbons of the thermoplastic substrate can be applied to a woven or non-woven fabric which can be used in the manufacture of a wide range of products, such as articles of clothing, footware, or upholstery for commercial or domestic furniture or for vehicle seats and facings.

Additionally, a discontinuous pattern can be produced by interrupting the flow of thermoplastic material through the die head periodically, for example by opening and closing a supply valve to the die head, or by blocking the die head by means of a suitable shutter. In this case, the material will be deposited onto a carrier and depending on the configuration of the die head and the rate of interruption of the flow, the substrate layer can be formed to a pattern of discrete areas comprising dots, or longitudinally extending dashes or stripes of constant or varying length, or transversely extending strips, or larger rectangular patches.

By selectively shuttering different portions of the die head for example using a serrated plate, it is possible to form a pattern in which longitudinally extending areas are interconnected by transverse areas so that the substrate layer comprises a perforated, apertured, or openwork web having a grid, lattice or lace appearance for example. More complex patterns could be produced by a printing technique in which the thermoplastic material in its molten state is applied to a patterned roller and transferred thereby to the carrier.

The flock fibres may be applied to the substrate, whether in the form of a continuous film or a patterned layer, by any suitable conventional technique, such as by an electrostatic method, or by using a transfer medium for example. The fibres may, however, most conveniently be applied shortly after the thermoplastic material leaves the die head, so that it is still tacky. Nevertheless, if desired, the fibres may be applied in a subsequent process. In this case, the thermoplastic substrate may be rendered tacky by the application of a suitable adhesive, or by warming to an appropriate temperature. The fibre may then be dropped or blown onto the tacky surface, and preferably lightly brushed or rolled to give sufficient adhesion. The same technique can be applied for applying the fibres to a thermoplastic substrate whilst it is still tacky after leaving the die head. These methods are also particularly suitable if the fibres are to be applied selectively in specific areas, rather than to the whole of the substrate layer.

For example, by using a pre-formed screen or mask, fibres of one colour can be applied to selected areas of the substrate layer, and then by using a different screen or mask, fibres of a further colour can be applied to different areas, and by repeating these processes as many colours as required may be applied in different areas. In a similar manner, fibres of differing length and/or composition may be applied in different areas, whether or not of different colours. Likewise, by a screening process fibres of a uniform colour or composition can be applied in accordance with a predetermined pattern rather than to the whole of the substrate layer, an arrangement which may be particularly advantageous where the substrate layer comprises a continuous film.

In all cases the flocked fabric produced can be embossed by the application of heat and pressure in selected areas to give a colour contrast pattern as explained in relation to FIG. 1 of the accompanying drawings.

A material in accordance with the invention to which a pattern can be applied by the application of heat and pressure in selected areas may thus comprise:

(a) a thermoplastic substrate layer having a coating of fibres over all or selected areas thereof, (b) a carrier material which releasably supports a thermoplastic layer having a coating of fibres over all or selected areas thereof, (c) a carrier material having thereon at least over part of its area, a non-releasable thermoplastic substrate layer having a coating of fibres over all of selected areas thereof.

The thermoplastic layer may be in the form of:

(a) a continuous sheet, strip, ribbon etc.

(b) an interrupted, apertured or openwork web, (c) discrete, separate areas of patches.

The following examples illustrate the use of the invention more specifically.

EXAMPLE A

A label or decorative patch for application to, for example, an article of clothing, is produced by forming a flocked material as described above in relation to FIG. 1 of the accompanying drawings. In this instance, the substrate material may be so chosen as to enable the label simultaneously to be embossed, to produce the required design, and attached to the article of clothing. A substrate material particularly suitable for this purpose is that referred to above as L.C.A.2, extruded into strip or sheet form. Flock fibres of an appropriate colour are attached to one face of the sheet in any suitable manner and blanks of the required size are cut therefrom.

The blank, that is to say, the unembossed material, consisting of flock fibres and substrate, is placed as required on the article of clothing which is positioned on the lower plattern of a heated plattern press of the appropriate size. The upper plattern carries an embossing die carrying a pattern as appropriate to the label or patch to be formed. Preferably, the die includes a raised periphery which defines the perimeter of the finished label or patch.

The dies are heated to a temperature which is typically in the region of 140° C. and the press is operated at a feed pressure of approximately 80 pounds per square inch for a period of approximately 20 to 30 seconds.

This operation embosses the label or patch to produce the required design thereon by softening the substrate material in regions contacted by the die so that the flock fibres are absorbed therein to produce the required colour contrast and thereby establish the pattern.

At the same time, the softening of the substrate material where it is contacted by the die, is sufficient to cause the substrate to adhere to the fabric of the garment. After cooling, any excess of the flock fabric around the periphery of the formed label or patch can be torn away.

EXAMPLE B

Figure 3:
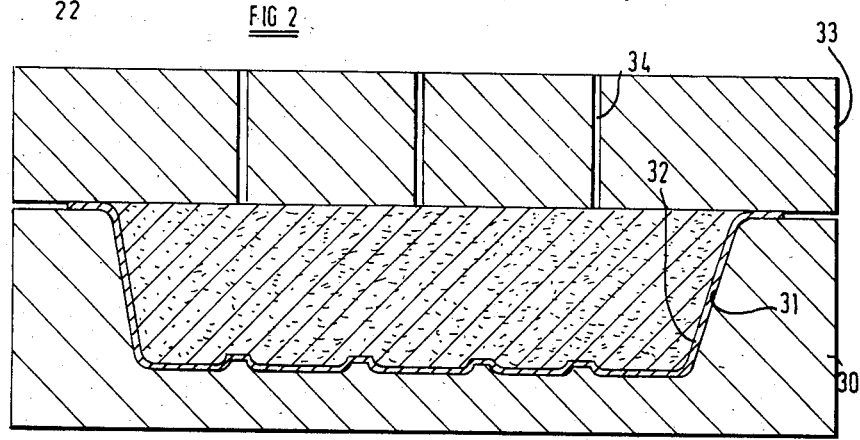
FIG. 3 illustrates the use of a fabric in accordance with the invention in the manufacture of a shaped article.

A flocked material as described in relation to FIG. 1 of the accompanying drawings may be shaped, for example by vacuum forming, and the shaped material may be placed in a mould, as shown in FIG. 3. As illustrated, the mould 30 includes a shaped mould cavity 31 which receives the vacuum-formed sheet 32 of flocked material in accordance with the invention. The mould is closed by a top plate 33 formed with injection channels 34 through which suitable plastic foam material is introduced to fill the mould cavity.

The material 32 may be embossed during the vacuum forming process by incorporating heated protruding elements within the forming mould in the positions required to produce the desired pattern.

Alternatively, the embossing of the material 32 can be carried out in a subsequent operation, before, during, or after the foam moulding stage shown in FIG. 3. Thus, the vacuum-formed sheet 32 may be subjected to a separate, embossing operation in which the required pattern is applied to the formed sheet by means of suitable heated dies. Alternatively, the mould 30 may be designed to effect the required embossing, or after the foam-filled sheet has been removed from the mould 30, it can be embossed by means of suitable heated dies.

EXAMPLE C

A facing material for use in automotive seating may be formed by employing the flocked material described in Example A above, as a facing fabric which is applied to one surface of a suitable foamed plastics material. The other surface of the foamed plastics material may carry a suitable backing fabric.

Figure 4:
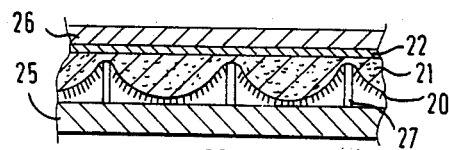
FIG. 4 illustrates a method of embossing a fabric in accordance with invention with a pattern simulating stitches.

In practice, as shown in FIG. 4, a prepared sandwich consisting of the flocked material 20 in accordance with the invention, a foam sheet 21, and the backing fabric 22 is cut to the desired blank size and placed between the tools 25, 26 of an HF or RF welding machine, for example. The welding tools may consist of metal bars 28 set into a suitable base so that when the tools are closed together, and the heating circuits are energised, the sandwich material is embossed along the lines of the bars. In a typical case, the welding machine would be of about 25 KW capacity and the welding operation would require about 8 seconds heating followed by 6 seconds dwell.

In this way, the sandwich material is permanently embossed so as to afford the required contour, while along the embossed lines, the flock coating is absorbed into the thermoplastic substrate to produce a colour contrast in accordance with the invention.

In an exactly similar manner, such material can be formed with a fine pattern definition to give a stitched or quilted effect, and such material can be used for the production of the upper parts of slippers or similar footwear.

It will be appreciated that material formed in this way, and as illustrated in FIG. 2, can also be used for other applications, and the reference to automotive seat facings and slippers is by way of example only.

EXAMPLE D

Multi-colour panels for use for any of the above purposes, can be formed by applying flock fibres of differing colours to the substrate in specific areas. For example, a layer of an appropriate substrate material can be cast onto a suitable release material such as PTFE coated fibreglass. Before the substrate substance dries, a appropriate mask is positioned above it and flock fibres of a first colour are applied to the unmasked area by any appropriate process. The mask is then removed and replaced by a second mask through which flock fibres of a second colour are applied to different areas of the substrate. Flock fibres of two or more different colours may be applied by using the appropriate number of masks.

The flocked material used in this way can be embossed by any of the methods described above, in order to provide a contrasting pattern superimposed on the pattern defined by the areas of different coloured fibres.

EXAMPLE E

A fabric, particularly suitable for use, because of its porous of breathable nature, in the manufacture of seat cushions and the like, for example for vehicle seating, is made utilising a backing material of a porous nature, such as a coagulated polyurethane material. This material is coated on one side with a layer of one of the thermoplastic materials mentioned previously in an intermittent pattern so that its porous nature is not lost. Flock fibres of the desired colour, contrasting with the colour of the thermoplastic substrate layer, are applied uniformly over the substrate layer. The gaps between individual areas of the thermoplastic substrate material, which allow the fabric to breathe, may be small and uniformly distributed so that the finished fabric has a substantially uniform appearance, or they may define a visible pattern of, for example, narrow stripes.

A pattern, for example simultating stitching, can be formed from the fabric by embossing using a heated die as shown in FIG. 4.

A flock fabric of this kind may be used, before or after embossing, as a facing layer for a seat cushion made for example from a foamed plastics material. More particularly, one layer of such fabric, a layer of foamed plastics material and a backing layer (which may comprise a further layer of the same fabric as the facing layer or a different material) are formed into a sandwich as described above in Example B, and then embossed to give the desired shaping or contour whilst simultaneously developing the required colour contrast along the lines of embossing.

Instead of using a preformed layer of foamed plastics material, the facing and backing layers may be joined together peripherily to form an envelope, and a quantity of a reaction mixture for producing a foamed plastics material may be introduced. The envelope may be confined between a pair of forming moulds while the foaming reaction proceeds, and such moulds may be shaped so as to emboss the facing layer with the required pattern under the pressure of the expanding material, the moulds being heated if necessary, although the heat of the reaction may be sufficient. Alternatively, such embossing of the facing layer may be performed in a separate operation subsequently by means of a heated die.

EXAMPLE F

A further, particularly advantageous use of the material in accordance with the invention arises from the elastic properties of the substrate materials. A pattern or master defining the shape of an article, such as a seat back, can be treated with a suitable release agent and then covered with a selected substrate material, for example by spraying such material in solution onto the pattern. Flock fibres can then be applied to the substrate material before it is completely dry. After drying the flocked substrate can be peeled off from the master, by virtue of its elastic properties. The shaped envelope thus produced can then be fitted over a pre-moulded cushion shaped in accordance with the pattern, or, whilst supported in a suitable mould, it can be filled with foaming plastics material, as illustrated in FIG. 3.

Whilst this method is particularly applicable to the manufacture of articles, such as cushions, which have a foam filling, it will be appreciated that covers for other types of articles can be produced in a similar way, as well as shaped, hollow articles which do not require to be filled. For example, the upper part of a slipper could be formed in this way so as to be pre-shaped.

In all of the above examples, the flocked material, in accordance with the invention, is specifically adapted to be embossed by the application of heat and pressure so as to produce a colour contrast in the embossed areas, by appropriate selection of the colour of the substrate and the colour of the flock fibres.

Whilst the present invention is directed primarily to flocked materials which are specifically adapted for the formation of colour-contrast patterns, certain aspects of the methods disclosed in the preceding description may be applicable, inventively, without the establishment of a colour-contrast pattern. For example, in some cases the colours of the flock fibres need not be chosen to contrast with the colour of the substrate material. In particular, the methods disclosed in Example F may advantageously be applied even where the embossing operation is not required to provide a colour contrast. Likewise, the selective flocking method disclosed in Example D may be applied in cases where a colour contrast is not established, at least in all areas, during the embossing operation.

The features disclosed in the foregoing description, or the accompanying drawings, expressed in their specific forms or in terms of a means for performing the disclosed function, or a method or process for attaining the disclosed result, may, separately or in any combination of such features, be utilised for realising the invention in diverse forms thereof.

I claim:

1. An embossed fabric comprising a coating of fibres of one or more colours on a substrate of thermo-plastic material which presents a base colour which contrasts with the fibres, wherein in selected areas the coating fibres have been compressed by the application of heat and pressure into the substrate so as at least partially to reveal a colour contrasting with that of the fibres adjacent to said selected areas.

2. A fabric according to claim 1 wherein the thermoplastic material is substantially colourless.

3. A fabric according to claim 1 wherein the fibres are substantially colourless.

4. A fabric comprising a coating in the form of fibres of one or more colours (which term includes colourless) on a substrate of a thermo-plastic material which presents a base colour which contrasts with the fibres such that the application of heat and pressure to the fabric in selected areas causes the fibres to be compressed into the substrate and thereby at least partially reveal the substrate to give rise to a colour in said selected areas which contrasts with that of the fibres adjacent to said selected areas.

5. A fabric according to claim 4 wherein the substrate comprises a hot-melt adhesive, PVC, or similar substance which will soften with the application of heat.

6. A fabric according to claim 4 wherein the coating is formed from chopped fibres having a melting or softening point significantly greater than that of the thermo-plastic substrate.

7. A method of producing a visible image on a fabric which consists of a coating in the form of fibres of one or more contrasting colours (which term includes colourless) on a substrate of a thermo-plastic material which presents a base colour which contrasts with the fibres wherein in selected areas corresponding to the desired visual image, heat and pressure is applied to the fabric so as to compress the fibres into the substrate and thereby produce a contrasting colour is said areas.

* * * * *